(12) United States Patent
Dupeyron et al.

(10) Patent No.: US 11,377,332 B2
(45) Date of Patent: Jul. 5, 2022

(54) MOVABLE BASE AND METHOD FOR TRANSPORTING EQUIPMENT

(71) Applicant: EXCENT FRANCE, Colomiers (FR)

(72) Inventors: Nicolas Dupeyron, Caubiac (FR); Baptiste Brault, Toulouse (FR)

(73) Assignee: EXCENT FRANCE, Colomiers (FR)

( * ) Notice: Subject to any disclaimer, the term of this patent is extended or adjusted under 35 U.S.C. 154(b) by 0 days.

(21) Appl. No.: 16/345,142

(22) PCT Filed: Nov. 7, 2017

(86) PCT No.: PCT/EP2017/078395
§ 371 (c)(1),
(2) Date: Apr. 25, 2019

(87) PCT Pub. No.: WO2018/087057
PCT Pub. Date: May 17, 2018

(65) Prior Publication Data
US 2019/0284032 A1    Sep. 19, 2019

(30) Foreign Application Priority Data

Nov. 9, 2016 (FR) ....................................... 1660869
Jun. 13, 2017 (FR) ....................................... 1755319

(51) Int. Cl.
*B66F 7/06* (2006.01)
*B60P 1/02* (2006.01)
(Continued)

(52) U.S. Cl.
CPC ............ *B66F 7/0625* (2013.01); *B60P 1/022* (2013.01); *B66F 7/0683* (2013.01); *B66F 7/08* (2013.01); *B64F 5/10* (2017.01); *B64F 5/50* (2017.01)

(58) Field of Classification Search
CPC ...... B64D 27/26; B66F 7/0625; B66F 7/0666; B66F 7/0691; B66F 7/08; B66F 7/22;
(Continued)

(56) References Cited

U.S. PATENT DOCUMENTS 2,471,901 A   5/1949  Ross
3,499,563 A * 3/1970 Thompson .............. B66F 9/186
                                                       414/608
(Continued)

FOREIGN PATENT DOCUMENTS

CN    202089739    12/2011
CN    204643731     9/2015
(Continued)

OTHER PUBLICATIONS

Search Report on related FR application (FR 1660869) from the French Intellectual Property Office dated Jul. 19, 2017.
(Continued)

*Primary Examiner* — Glenn F Myers
(74) *Attorney, Agent, or Firm* — Ipsilon USA, LLP

(57) ABSTRACT

The invention relates to a movable base for transporting equipment by land, in particular aeronautical equipment. The movable base comprises a frame including two side arms designed to move parallel to one another and means for rolling on the ground, which are connected to the frame. Each side arm comprises lifting means designed to move the equipment vertically and to tilt same between the side arms.

17 Claims, 12 Drawing Sheets

(51) Int. Cl.
*B66F 7/08* (2006.01)
*B64F 5/10* (2017.01)
*B64F 5/50* (2017.01)

(58) Field of Classification Search
CPC ...... B66F 7/20; B66F 7/06; B66F 7/26; B66F 7/0683; B66F 7/065; B66F 7/0658; B66F 7/0616; B66F 7/0633; B66F 9/065; B66F 9/06; B66F 9/143; B64F 5/50; B64F 5/10; B64F 5/00; B60P 1/022
See application file for complete search history.

(56) References Cited

U.S. PATENT DOCUMENTS

| | | | | |
|---|---|---|---|---|
| 5,201,629 | A * | 4/1993 | Simpson | B66F 9/07545 180/306 |
| 5,450,928 | A * | 9/1995 | Isogai | B66F 7/0691 187/205 |
| 6,485,247 | B1 | 11/2002 | Groves et al. | |
| 8,162,575 | B2 * | 4/2012 | Knurr | B66F 7/0625 410/47 |
| 9,016,226 | B2 * | 4/2015 | Smith | B63B 17/0081 114/343 |
| 2015/0028787 | A1 * | 1/2015 | Sekine | B66F 7/065 318/494 |

FOREIGN PATENT DOCUMENTS

| | | |
|---|---|---|
| CN | 205575508 | 9/2016 |
| DE | 196 12 626 A1 | 10/1997 |
| EP | 2 165 932 A2 | 3/2010 |
| FR | 3 008 070 A1 | 1/2015 |

OTHER PUBLICATIONS

International Search Report and Written Opinion on corresponding PCT application (PCT/EP2017/078395) from International Searching Authority (EPO) dated Feb. 14, 2018.

* cited by examiner

MOVABLE BASE AND METHOD FOR TRANSPORTING EQUIPMENT

TECHNICAL FIELD

The present invention relates to the field of equipment for installing and removing an aircraft engine, in particular during a maintenance operation.

In a known manner, an aircraft comprises a plurality of engines that are used to propel the aircraft. An engine is a crucial piece of technological equipment for an aircraft and needs to be periodically inspected in a precise manner. For this purpose, the engine must be disassembled from the aircraft for the inspection thereof (removal step) and then reassembled after inspection (installation step).

The installation and removal steps are critical and complex since an engine can weigh several tonnes and the connection thereof to the aircraft must be made with precision.

In the prior art, with reference to FIG. 1, in order to install an engine M on its aircraft, the engine M is firstly placed in a carriage 100 equipped with wheels in order to allow the engine M to be moved in a hangar. The carriage comprises a receiving cradle 101 in which the engine M is stably held. The carriage 100 is then raised by means of cables known to a person skilled in the art as a "bootstrap" or by telescopic supports equipped with forks. In other words, both transport means and lifting means must be provided.

In order to overcome this logistical and financial drawback, the patent application DE3427042A1 proposes a carriage incorporating lifting means. Such a carriage is expensive since it integrates the lifting means. Moreover, the cradle is only suitable for a single type of engine and adapters must be provided, where possible, if a different engine is to be supported, which increases costs and the risk of error.

One purpose of the invention is thus to overcome these drawbacks by proposing a new tool for transporting, installing and removing an aircraft engine that can accelerate the rates of installation/removal while providing increased ergonomics and at a reduced cost.

SUMMARY

The invention relates to a movable base for transporting equipment on the ground, in particular aviation equipment, the movable base comprising a frame comprising two side arms designed to move parallel to one another so as to modify the spacing therebetween and means for rolling on the ground, which are connected to said frame, each side arm comprising lifting means designed to vertically move and tilt equipment situated between said side arms.

Thanks to the movable base, many different types of equipment can be lifted and tilted between the side arms. The movable base can advantageously move an engine positioned in a cradle as well as an engine positioned in a carriage. The movable base is universal and can transport large and heavy equipment in a convenient way for installation/removal.

Preferably, the lifting means of a side arm comprise at least one lifting member extending towards the other of the two side arms. Thus, the lifting means can be used to support equipment from the side, which facilitates the tilting thereof.

Preferably, the lifting member reaches a height above the ground that lies in the range 0 cm to 20 cm when the lifting means are lowered. Thus, the lifting member can slide into a cavity or raised portion of the equipment in order to lift it in a convenient manner, even when the latter is at rest on the ground. Preferably, the lifting means are designed to undergo a vertical movement at least equal to 100 cm.

Preferably, the lifting member has an L-shape such that it extends at a low altitude in order to lift equipment.

Preferably, each side arm comprises at least two lifting members spaced apart from one another along the length of said side arm in order to distribute the lifting forces and facilitate tilting.

More preferably, the frame has a U-shape defining a base and two side arms. A U-shape advantageously defines a cavity in which equipment to be lifted can be positioned.

According to a preferred aspect, the lifting means of a side arm comprise at least two independent lifting mechanisms connected to said side arm so as to allow for tilting. Preferably, each lifting mechanism comprises a dynamometer so as to control the movements.

According to one aspect of the invention, the base comprises means of precise displacement, independent of the rolling means, designed to support the frame on the ground. Preferably, the means of precise displacement comprise rolling balls, preferably integrated into the cylinder legs. Such means of precise displacement provide flexibility during the installation/removal of the equipment.

According to another aspect of the invention, the lifting means of each side arm comprise means of precise displacement designed to provide flexibility during the installation/removal of the equipment. Thus, the lower portion of the movable base does not move, and the flexibility is provided only in the upper portion.

Preferably, when the lifting means are in the form of a lifting arm, the means of precise displacement are located in the upper portion of the lifting arm so as to provide flexibility as close as possible to the engine during the installation and removal thereof. This advantageously provides the operators with clearance for the installation/removal operation, which can conveniently be used at breast height.

Preferably, the means of precise displacement comprise a plurality of connecting rods designed to allow a precise movement in several directions in the manner of a swing or a pendulum. Preferably, the connecting rods are designed to allow a movement along the horizontal plane of at least 10 mm relative to a position of equilibrium. Preferably, the ends of each connecting rod are connected by a ball joint link.

Preferably, each connecting rod has a length that lies in the range 250 mm to 450 mm. According to a preferred aspect, each lifting arm comprises a platform and lifting mechanisms connected to the ends of the platform by means of precise displacement, in particular, at least one connecting rod, preferably two connecting rods.

Preferably, each lifting arm comprises a platform and two lifting mechanisms connected to the ends of the platform, each lifting mechanism being connected to one end of the platform by two connecting rods.

The invention further relates to a system for precisely displacing equipment. The displacement system comprises at least one supporting member for supporting said equipment and a frame, which is movable or stationary, and which is connected to said supporting member by at least three connecting rods comprising ball joints at the ends thereof so as to allow said equipment to be supported in a pendular manner in order to move same in a practical and ergonomic way.

Preferably, the system for precise displacement can be integrated into a movable base as well as into other tools suitable for moving or positioning equipment in a precise manner.

Preferably, the side arms are designed to be spaced at least 200 cm apart, preferably at least 250 cm apart. Preferably, the minimum internal spacing is less than 160 cm so as to facilitate transport by road on a trailer. More specifically, the overall width is thus less than 250 cm in order to fit onto a flatbed truck.

The invention further relates to a method for transporting equipment by means of a movable base as described above, the method comprising:
- a step of positioning the side arms of the frame such that the equipment is located between said side arms;
- a step of bringing the side arms closer together so as to engage with said equipment;
- a step of lifting the equipment using the lifting means such that said equipment is supported by said movable base, and
- a step of moving said movable base on the ground so as to move said equipment.

Transport is carried out in a safe manner by means of the movable base which allows the equipment to be grasped before the lifting and/or tilting thereof.

The invention further relates to a carriage for an aircraft engine comprising a cradle for receiving an aircraft engine and a movable base suitable for supporting said receiving cradle and for moving it on the ground.

The invention is remarkable in that the receiving cradle and the movable base are independent and suitable for being connected together in a removable manner.

Thus, advantageously, the receiving cradle can be used independently of the movable base, in particular for temporarily storing an aircraft engine. Similarly, the movable base can be used independently of the receiving cradle for the connection thereof to another connecting cradle. Advantageously, in order to remove a first aircraft engine and install a second aircraft engine, two receiving cradles can be used with only one movable base, which procures financial and logistical savings.

Preferably, the receiving cradle comprises a frame for receiving an aircraft engine and supporting legs suitable for raising said frame above the ground. Thus, during the temporary storage of an engine, said engine is raised above the ground so as to be easily transported at a later time by means of a lifting device or by means of the movable base. Moreover, this prevents the aircraft engine from being in contact with dust on the ground.

More preferably, the supporting legs are suitable for moving between a retracted transport position and a projecting storage position. Thus, the overall dimensions of the receiving cradle are reduced when said cradle is connected to the movable base in order to allow the carriage to be positioned beneath an engine. When the receiving cradle is used independently, the supporting legs are deployed so as to increase the floor span thereof and thus the stability thereof, which is advantageous considering the weight of an aircraft engine.

Preferably, each supporting leg comprises a pivoting portion. More preferably, each supporting leg comprises a sliding portion. Thus, each supporting leg can be retracted into the retracted position. Preferably, the receiving cradle comprises at least 3 legs, preferably 3 or 4 legs.

According to a preferred aspect, the movable base comprises lifting means designed to vertically move said receiving cradle so as to allow the installation and removal of the aircraft engine. In other words, the lifting means are directly integrated into the movable base, which prevents the need to use separate means. This is particularly advantageous given that the base is independent of the receiving cradle. Thus, there is no need for a plurality of carriages comprising lifting means when handling a plurality of aircraft engines, as is the case in the prior art. Preferably, the lifting means are designed to undergo a vertical movement at least equal to 100 cm.

Preferably, the lifting means are suitable for being connected, in a removable manner, to said receiving cradle. Thus, the receiving cradle can be used independently and have a reduced cost since the lifting means belong to the movable base.

According to a specific aspect, the lifting means comprise a plurality of lifting arms, preferably at least three lifting arms in order to lift a cradle in a balanced manner while allowing the inclination thereof along 2 axes.

Preferably, each lifting arm is suitable for carrying out a "Scott Russel"-type kinematic movement, preferably by horizontal actuation. Thus, the vertical travel of the arm is high while limiting the height dimensions thereof.

Preferably, the movable base comprises a frame and means for rolling on the ground. Thus, the movable base is simple to move. Preferably, the lifting means are secured to said frame.

Preferably, the receiving cradle is designed to be connected to the movable base according to a first transport configuration and according to a second lifting configuration. The connection between the receiving cradle and the movable base differs depending on the use made of the carriage.

More preferably, the movable base comprises damping means suitable for engaging with the receiving cradle in the first transport configuration. Thus, during transport, the vibrations are damped by the movable base and are thus not transmitted to the aircraft engine.

Preferably, the lifting means comprise connecting members suitable for engaging with the receiving cradle in the second lifting configuration. Preferably, only the lifting means are connected to the receiving cradle.

Preferably, the receiving cradle comprises supporting arms suitable for stabilising an aircraft engine arranged in said receiving cradle.

The invention further relates to an aircraft engine and carriage assembly as described above, whereby the aircraft engine is arranged in the receiving cradle.

The invention further relates to a method for transporting an aircraft engine by means of a carriage as described above, the aircraft engine being arranged in the receiving cradle in a storage position, the method comprising:
- a step of connecting the movable base with the receiving cradle such that said receiving cradle is supported by said movable base, and
- a step of moving said movable base on the ground so as to move the aircraft engine arranged in the receiving cradle.

Thus, the receiving cradle can be used independently to support an aircraft engine, which is advantageous. The movable base can thus be used with a plurality of receiving cradles and can be linked/connected to a receiving cradle only during transport and lifting.

Preferably, the method comprises a step of lifting said receiving cradle by said movable base so as to allow the aircraft engine to be installed. Thus, the carriage can lift an engine without additional technical means.

BRIEF DESCRIPTION OF DRAWINGS

The invention will be clearly understood after reading the following description, which is provided for purposes of illustration only and with reference to the accompanying figures, wherein.

It should be noted that the figures show the invention in detail for the implementation thereof, and that said figures can be used to better define the invention if necessary.

DETAILED DESCRIPTION

Figure 1:
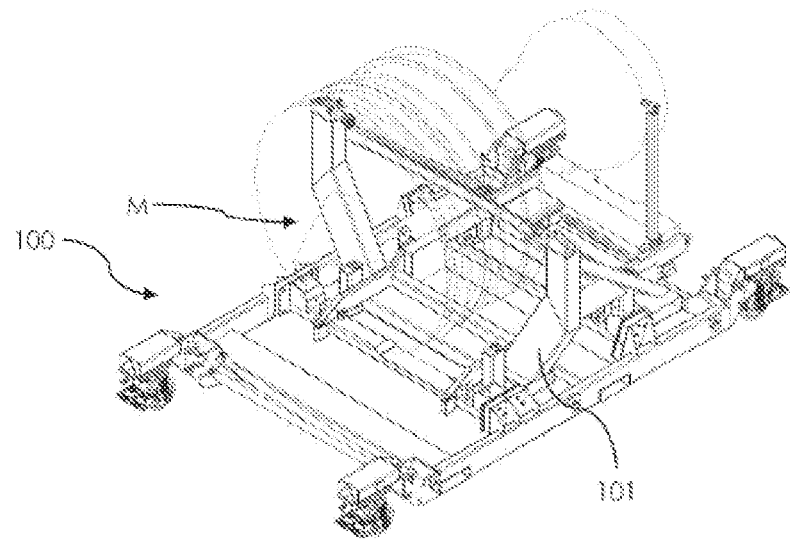
FIG. 1 is a diagrammatic view of an aircraft engine carriage according to the prior art.
Figure 2:
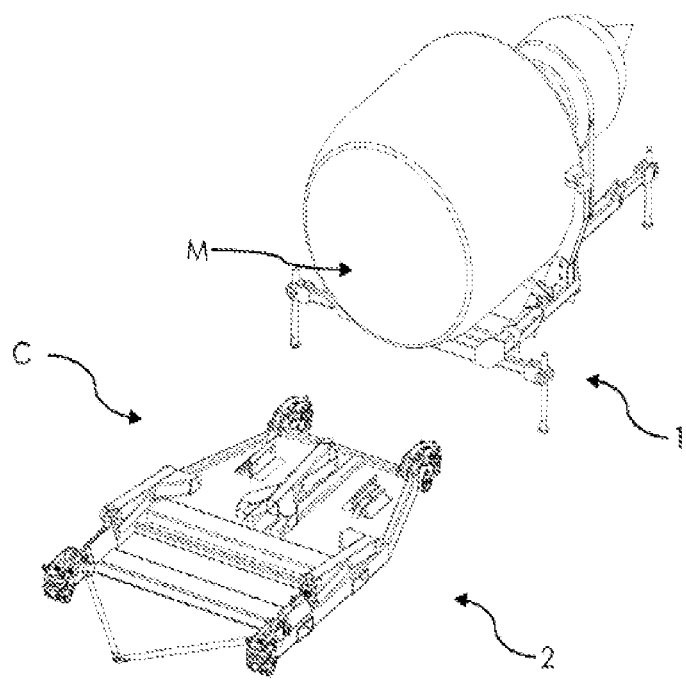
FIG. 2 is a diagrammatic view of an aircraft engine carriage according to the invention comprising a movable base and a receiving cradle which are disconnected.
Figure 3:
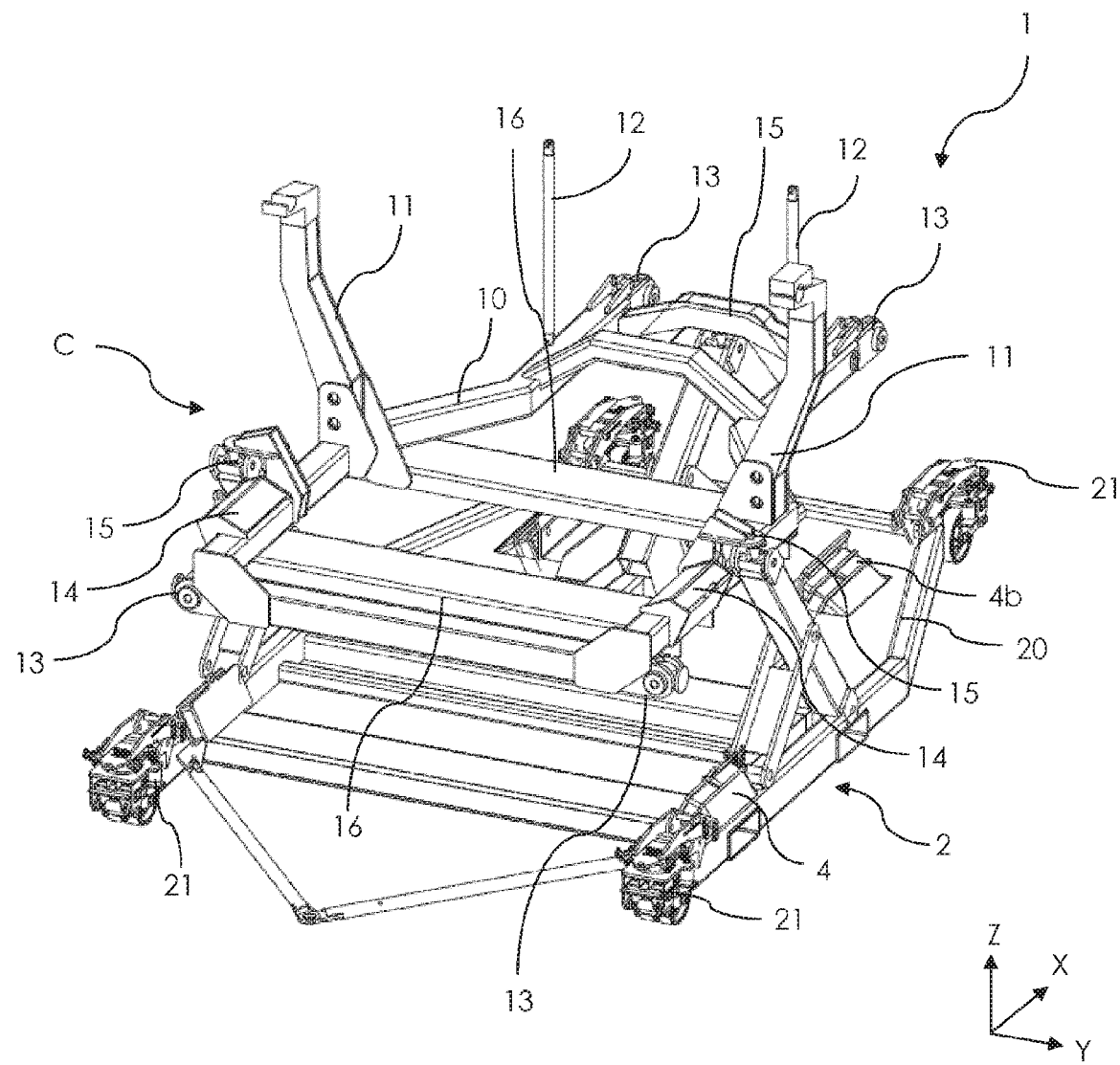
FIG. 3 is a diagrammatic view of an aircraft engine carriage according to the invention comprising a movable base and a receiving cradle which are connected.

FIGS. 2 and 3 show a carriage C of an aircraft engine M according to one embodiment of the invention. As will be described in detail hereafter, such a carriage C can be used to carry out, in a practical and reliable manner, steps of transporting, installing and removing an aircraft engine M while reducing costs associated with logistics. As a reminder, an aircraft engine M can have a high mass, of the order of 2 tonnes to 7 tonnes, and must be mounted in a precise and controlled manner on an aircraft.

The invention will be described for the transport of an engine; however, it applies for the transport of any equipment, in particular aviation equipment.

The carriage C comprises a receiving cradle 1 for receiving an aircraft engine M and a movable base 2 which are connected in a removable manner. Thus, the receiving cradle 1 and the movable base 2 can be used independently. In particular, an operator can have a plurality of receiving cradles 1 for receiving a plurality of aircraft engines M and have only a single movable base 2 for moving the receiving cradles 1 during the installation and removal steps.

The dimensions of the carriage C are suitable for having a vertical span of less than 60 cm such that said carriage can slide under an engine M mounted on an aircraft, the thrust reverser cowls whereof are open.

Subsequently, with reference to FIG. 3, the carriage C will be described in a system of coordinates (X, Y, Z) wherein the X axis extends longitudinally from back to front, the Y axis extends laterally from left to right and the Z axis extends vertically from bottom to top.

With reference more particularly to FIG. 3, the receiving cradle 1 comprises a frame 10 on which supporting arms 11 and supporting rods 12 are mounted so as to optimally hold an engine M. In this embodiment, the frame 10 takes on the form of a mechanically welded structure, in particular a mechanical structure with a high mechanical strength so as to withstand a mass of several tonnes. The supporting arms 11 are mounted such that they pivot relative to the frame 10 so as to facilitate the release of the engine M during an installation/removal operation, as described hereafter. In this embodiment, each supporting arm 11 comprises, at the upper end thereof, a clamping jaw for locking the engine M in position.

Figure 6:
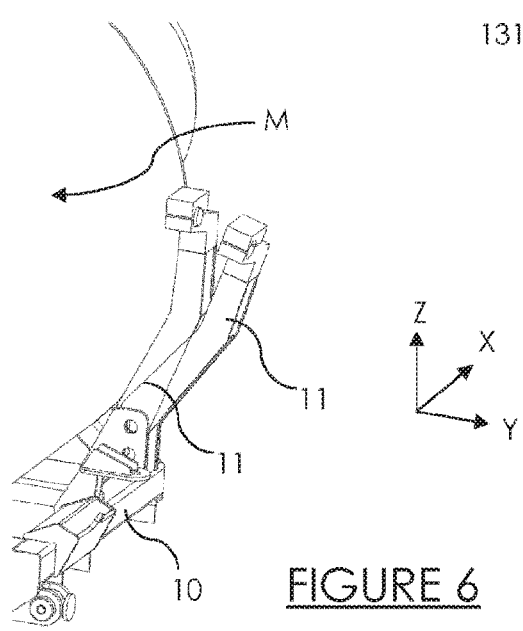
FIG. 6 is a diagrammatic close-up view of a supporting arm of a receiving cradle.

With reference to FIG. 6, the supporting arms 11 are hinged on the frame 10 about a longitudinal hinge axis such that they retract during the installation/removal of the engine M in order to free up space.

It goes without saying that the number and shape of the supporting arms 11 and supporting rods 12 can vary depending on the engine M to be supported.

In this embodiment, the receiving cradle 1 further comprises supporting legs 13 suitable for raising the frame 10 of said receiving cradle 1 relative to the ground, preferably to a vertical height that lies in the range 30 cm to 70 cm, preferably in the range 40 cm to 60 cm, and preferably of the order of 50 cm. Such supporting legs 13 advantageously allow the engine M to be raised in order to place the movable base 2 under the receiving cradle 1 for the transportation thereof. Moreover, the engine M is protected from dust or other pollutants on the ground.

Figure 4:
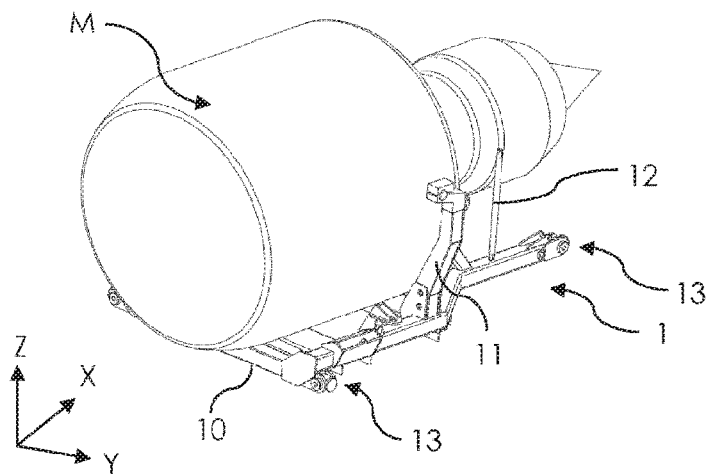
FIGS. 4 and 5 show a receiving cradle in the transport position (FIG. 4) and in the storage position (FIG. 5)
Figure 5:
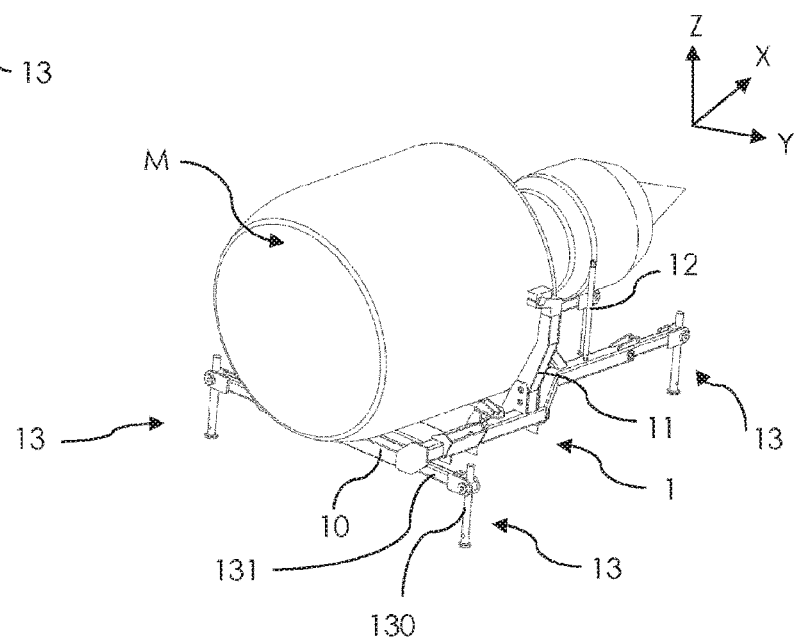

As shown in FIGS. 3 to 5, the receiving cradle 1 comprises four supporting legs 13 which are mounted on the frame 10. In this example, the receiving cradle 1 comprises two pairs of supporting legs 13 (a front pair and a rear pair); however, it goes without saying that the number and position of the supporting legs 13 could be different.

Advantageously, the supporting legs 13 are capable of retracting relative to the frame 10 between a retracted position and a projecting position. In the retracted position, as shown in FIG. 4, the supporting legs 13 extend horizontally in the vicinity of the frame 10 in order to minimise the overall dimensions thereof. In the projecting position, as shown in FIG. 5, the supporting legs 13 extend vertically so as to move the frame 10 away from the ground. In the projecting position, the supporting legs 13 are also designed to move away from the centre of the frame 10 so as to move the supporting legs 13 away from one another and thus improve stability.

In this example, with reference to FIG. 5, each supporting leg 13 comprises a spacer element 131 which is mounted such that it slides in the frame 13 in order to allow the supporting leg 13 to be moved away into the projecting position as described above. Preferably, the spacer element 131 is suitable for sliding laterally along the Y axis. Each supporting leg 13 further comprises an articulated stand 130 suitable for pivoting relative to the spacer element 131 thereof between the retracted position and the projecting position.

With reference to FIG. 3, the receiving cradle 1 further comprises sleeves 16 secured to the frame 10 and designed to allow for the insertion of a lifting fork in order to move said receiving cradle 1. With reference to FIG. 3, the sleeves 16 extend laterally in the receiving cradle 1 along the Y axis. It goes without saying that the receiving cradle 1 could further comprise lifting rings in order to be moved by means of a hook.

Preferably, a receiving cradle 1 is specific to each aircraft engine M for the optimal support thereof. It goes without saying that adaptation elements could moreover be provided in order to adapt a receiving cradle 1 of standard shape to suit a plurality of aircraft engines M.

Figure 7:
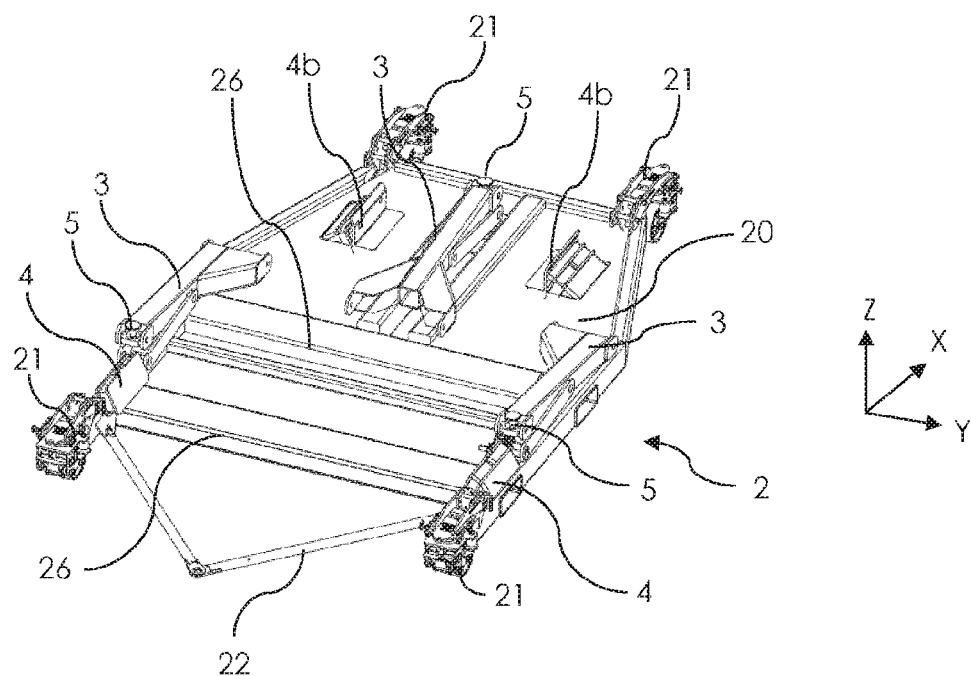
FIGS. 7 and 8 show a movable base in the transport position (FIG. 7) and in the lifting position (FIG. 8)
Figure 8:
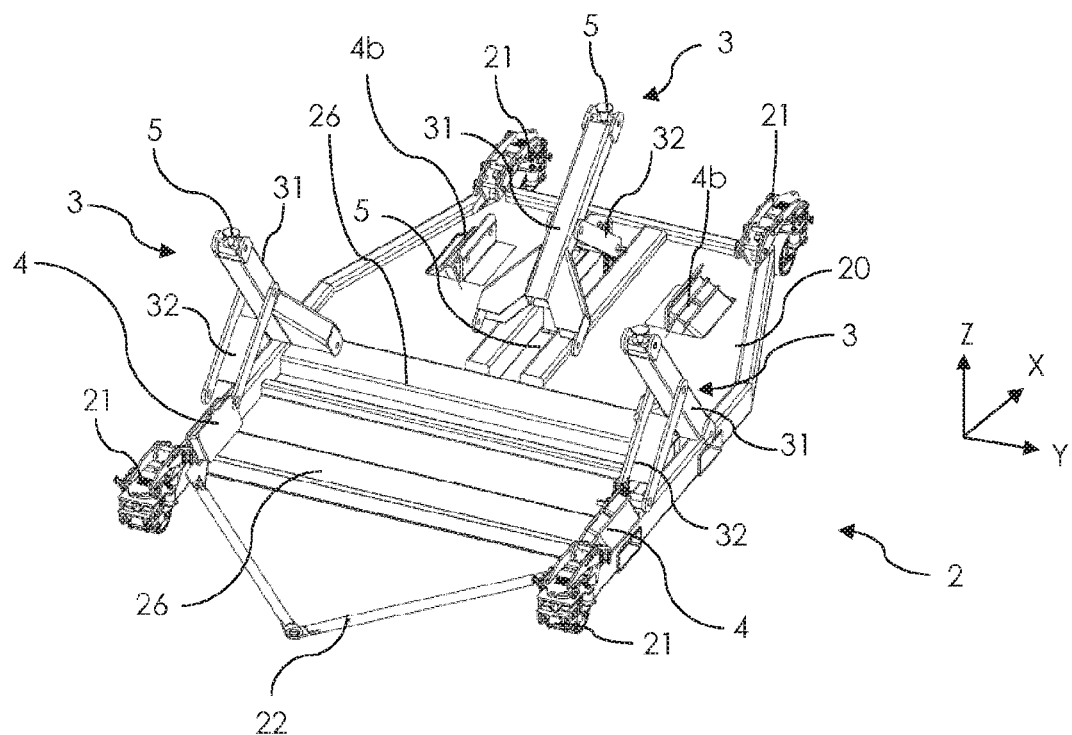

With reference to FIGS. 7 and 8, the movable base 2 comprises a substantially parallelepiped-shaped frame 20 which has a high mechanical strength so as to be able to withstand a mass of several tonnes. The frame 20 is preferably made of metal.

The movable base 2 comprises rolling means which, in this example, take on the form of four wheels 21 (one front pair and one rear pair). Thus, the movable base 2 can be moved by rolling on the ground. Preferably, the wheels 21 are equipped with brakes in order to be able to safely immobilise the movable base 2. It goes without saying that other rolling means could be suitable, in particular Mecanum-type omni-directional wheels.

In this embodiment, the movable base 2 comprises, at the front end thereof, a drawbar 22 to allow the movable base 2 to be towed. Nonetheless, the movable base 2 could further comprise autonomous displacement means such as an engine.

Similarly to the receiving cradle 1, the movable base 2 comprises sleeves 26 secured to the frame 20 and designed to allow for the insertion of a lifting fork in order to move the movable base 2. With reference to FIGS. 7 and 8, the sleeves 26 extend laterally in the movable base 2 along the Y axis. It goes without saying that the movable base 2 could further comprise lifting rings in order to be moved by means of a hook.

Still with reference to FIGS. 7 and 8, the movable base 2 further comprises lifting means designed to vertically move said receiving cradle 1 relative to the frame 20 of said movable base 2 so as to allow for the installation and removal of the aircraft engine M.

In this embodiment, the lifting means take on the form of three lifting arms 3 designed to vertically raise the receiving cradle 1.

In this example, each lifting arm 3 is designed to perform a "Scott Russel" kinematic movement in order to allow for a large vertical movement by undertaking a horizontally-controlled journey which limits the overall height span. Nonetheless, it goes without saying that other kinematics could be suitable, in particular a scissors kinematic.

As shown in FIGS. 7 and 8, each lifting arm 3 comprises a first element 31, a lower end whereof is capable of sliding longitudinally and is suitable for being hinged on the frame 20 about a lateral hinge axis and a second element 32, an upper end whereof is hinged to the first element 31 about a lateral hinge axis and the lower end whereof is hinged to the frame 20 so as to guide the straightening of the first element 31. Preferably, the lower end of the first element 31 is equipped with a roller to facilitate the longitudinal movement thereof. In this example, each lifting arm 3 further comprises an engine designed to move the lower end of the first element 31 and, consequently, designed for the raising/lowering of said lifting arm 3. Each engine is capable of being controlled by an operator, preferably by means of a remote control. Advantageously, each lifting arm 3 can be controlled independently in order to lift the receiving cradle 1 vertically but also to tilt it along both axes in order to facilitate an installation and removal operation. Such a degree of freedom facilitates the orientation of the engine M. In this embodiment, the displacement means are designed to undergo a vertical movement of at least 100 cm, preferably at least 150 cm. Moreover, the allowed degree of incline is of the order of +/−5° about the longitudinal axis X, and +/−10° about the lateral axis Y.

Each lifting arm 3 further comprises a connecting member 5 for connection to the receiving cradle 1, which will be described hereafter.

In this embodiment, the receiving cradle 1 is suitable for connecting to the movable base 2 according to two different types of connection depending on the mode of use of the carriage C. The two types of connection allow for a removable connection between the receiving cradle 1 and the movable base 2.

The receiving cradle 1 is suitable for being connected to the movable base 2 according to a first type of connection during the transport of an engine M.

For this purpose, with reference to FIGS. 7 and 8, the movable base 2 comprises damping means which take on the form of a plurality of damping members 4 mounted on the frame 20 of the movable base 2 and designed to damp the relative movements between the receiving cradle 1 and the movable base 2. Preferably, each damping member 4 takes on the form of an elastomer or a suspension. Preferably, the receiving cradle 1 comprises four damping members 4 in order to achieve optimal damping, wedge the engine M and limit the lateral travel thereof. The movable base 2 comprises two front damping members 4 comprising an inclined wall in order to allow wedging and centring of the receiving cradle 1. The movable base 2 further comprises two rear damping members 4b suitable for extending outwardly relative to the receiving cradle 1 in the transport position and thus limiting the lateral travel thereof.

The receiving cradle 1 comprises primary connection means designed to engage with the damping means of the movable base 2. In this example, with reference to FIG. 3, the primary connection means comprise two primary connection members 14 each taking on the form of an inclined shim. Each primary connection member 14 is fixed to the frame 10 of the receiving cradle 1 and suitable for corresponding with the rear damping members 4 of the movable base 2 when the receiving cradle 1 is placed in the movable base 2. The rear portion of the receiving cradle 1 is also laterally held between the rear damping members 4b. The receiving cradle 1 is thus securely supported in order to prevent the transmission of vibrations from the movable base 2 to the receiving cradle 1. The engagement of the inclined walls advantageously allows for the self-centring of the receiving cradle 1 in the movable base 2.

The receiving cradle 1 is suitable for being connected to the movable base 2 according to a second type of connection when lifting an engine M.

Figure 9:
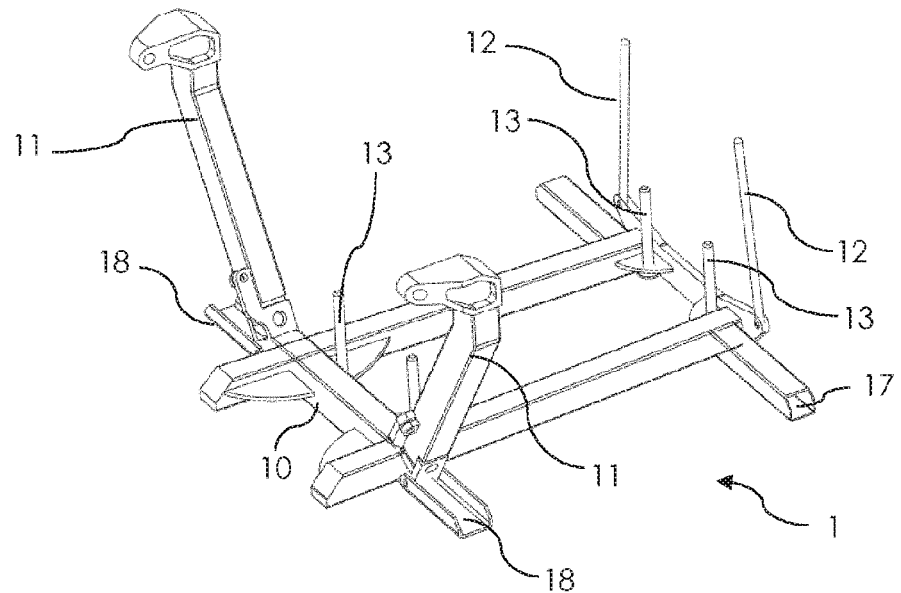
FIGS. 9 and 10 show a second embodiment of a receiving cradle.
Figure 10:
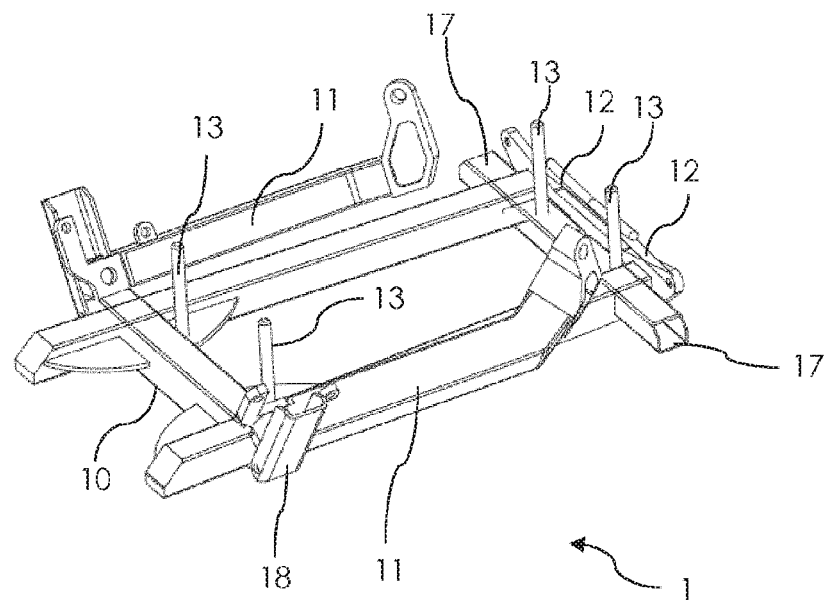

For this purpose, with reference to FIGS. 9 and 10, the movable base 2 comprises, at the end of each lifting arm 3, a connecting member 5 designed to engage with secondary connection means of the receiving cradle 1. In this example, the connecting member 5 takes on the form of a ball joint so as to allow tilting clearance between the receiving cradle 1 and the movable base 2, which provides flexibility when lifting and allows tilting.

In this example, with reference to FIG. 3, the secondary connection means comprise three secondary connection members 15 each taking on the form of a vertical wall suitable for being moved vertically from bottom to top. Each secondary connection member 15 is fixed to the frame 10 of the receiving cradle 1 and suitable for corresponding with the connecting members 5 of the lifting arms 3.

Advantageously, during the handling of the receiving cradle 1, the set of ball joints makes it possible to control the tilting of the receiving cradle 1. Moreover, such ball joints facilitate the self-centring of the receiving cradle 1 in the movable base 2. Preferably, the connection of the lifting arms 3 with the receiving cradle 1 forms a Boys bond or the like in order to obtain an isostatic connection.

Preferably, each lifting arm 3 is equipped with at least one force sensor in order to measure, limit and/or record the forces applied to each lifting arm 3.

Advantageously, the same movable base 2 can engage with any receiving cradle 1 comprising such connection means. In other words, the same movable base 2 can be universally connected to different types of receiving cradle 1, the supporting arms 11 and the supporting rods 12 whereof have different features in order to accommodate different engines M.

A second embodiment of a receiving cradle 1 is described with reference to FIGS. 9 and 10. The reference numerals used to describe elements having a structure or function that is identical, equivalent or similar to those of the elements shown in FIG. 3 are the same, so as to simplify the description. Moreover, the description of the embodiment shown in FIG. 2 is not repeated in its entirety since this description applies to the elements shown in FIGS. 9 and 10 when there are no incompatibilities. Only noteworthy, structural and functional differences are described.

FIGS. 9 and 10 show a second embodiment of a receiving cradle 1, the supporting arms 11 whereof are capable of retracting so as to extend in the plane of the frame 10 into the retracted position as shown in FIG. 10. In particular, the supporting arms 11 are suitable for bending along the length of the frame 10. Similarly, the connecting rods 12 are also retractable so as to extend in the plane of the frame 10 into the retracted position as shown in FIG. 10. In particular, the connecting rods 12 are suitable for bending along the width of the frame 10. The receiving cradle 1 further comprises supporting legs 13 taking on the form of retractable stands.

In this second embodiment, the receiving cradle 1 has a simplified structure and does not comprise sleeves or primary connection means. In order to allow the receiving cradle 1 to be moved by a movable base 2, said receiving cradle comprises secondary connection means comprising a plurality of lifting supports, in particular four so as to procure balanced lifting. The secondary connection means comprise a vertical wall, separated from the ground, so as to be lifted vertically by the movable base 2.

In this second embodiment, the frame 10 comprises, at a first end, lifting supports taking on the form of hollow tubes 17, the opening whereof is laterally oriented and, at a second end, lifting supports taking on the form of a flat wall 18. The lifting supports are designed to retract into the frame 10 into the rest position and to deploy, in particular when lifting and/or supporting an engine M. Preferably, the hollow tubes 17 are mounted such that they slide in the frame 10, whereas the flat walls 18 are hinged. In the rest position, a plurality of unused receiving cradles 1 can be stacked in order to limit the space occupied thereby.

This document will now describe a method for replacing a first aircraft engine with a second aircraft engine in an aircraft by means of the carriage C according to the invention.

Firstly, the carriage C is in the transport position, the receiving cradle 1 being mounted on the damping means of the movable base 2. The carriage C is empty and is positioned under the nacelle of the aircraft to which the aircraft engine to be replaced (hereafter referred to as the first engine M1) is suspended.

Advantageously, the carriage C has a reduced vertical dimension of less than 60 cm, which allows it to slide conveniently under numerous types of engines M with the cowls open.

Once in position, the connection between the receiving cradle 1 and the movable base 2 is changed. More specifically, during transport, the receiving cradle 1 is at rest on the damping members 4 in order to dampen shocks and vibrations. In view of the removal operation, the connecting members 5 of the lifting arms 3 of the movable base 2 are connected to the secondary connection members 15 of the receiving cradle 1. For this purpose, the lifting arms 3 are controlled such that they raise the receiving cradle 1. The weight of the receiving cradle 1 is thus supported by the lifting arms 3.

Then, the lifting arms 3 of the movable base 2 are again lifted by the operator, in particular by means of a remote control, such that the receiving cradle 1 is moved vertically upwards in the vicinity of the first engine M1. The supporting arms 11 and the connecting rods 12 of the receiving cradle 1 are then positioned on the first engine M1 for the holding thereof. The connection between the receiving cradle 1 and the movable base 2 provides flexibility for positioning, which facilitates removal. Indeed, thanks to the lifting arms 3, the receiving cradle 1 can be inclined slightly about the X and Y axes. Then, the first engine M1 is disconnected from the aircraft in order to be supported by the carriage C. The weight of the first engine M1 is thus supported by the movable base 2 via the lifting arms 3. Advantageously, control of the load transfer is carried out by the force sensors.

The first engine M1 is then lowered by the lifting arms 3 such that the receiving cradle 1 is again at rest on the damping members 4 of the movable base 2 in order to be moved away from the aircraft without any problems. In this example, the first engine M1 is moved, thanks to the wheels 21 thereof, in a hangar for overhaul. The vibrations occurring during transport are advantageously damped by the damping members 4.

Once the carriage C, supporting the first engine M1, has reached its destination, the lifting arms 3 are raised such that the weight of the receiving cradle 1 is supported by the lifting arms 3. The supporting legs 13 of the receiving cradle 1 are thus deployed and the lifting arms 3 are lowered such that the supporting legs 13 are at rest on the ground. The weight of the first engine M1 is thus supported by the supporting legs 13. During the lowering thereof, the lifting arms 3 are automatically disconnected from the receiving cradle 1.

The weight of the first engine M1 is thus no longer supported by the movable base 2 which can thus be removed. This undergoes longitudinal translation in order to release the receiving cradle 1, and the first engine M1 can thus be stored independently.

Figure 11A:
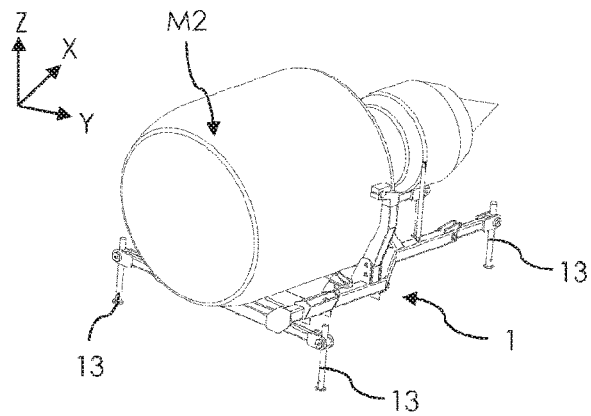
FIG. 11A-11F show steps for storing, transporting and lifting an aircraft engine by means of a carriage according to the invention.
Figure 11B:
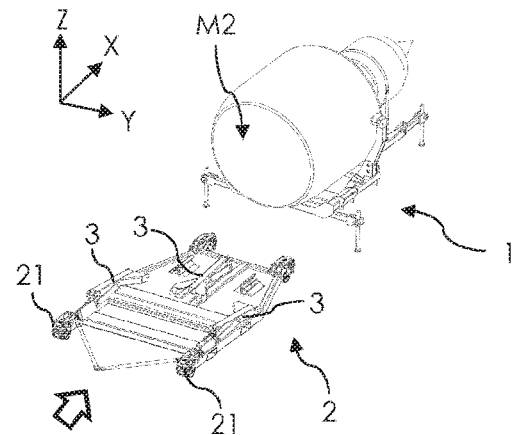

With reference to FIGS. 11A and 11B, the movable base 2 can then be moved to another receiving cradle 1 supporting the new engine to be installed on the aircraft (referred to as the second engine M2).

Figure 11C:
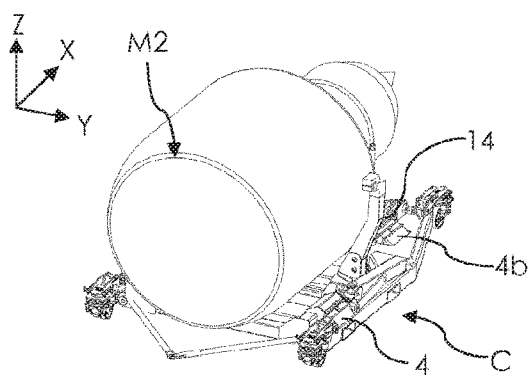
Figure 11D:
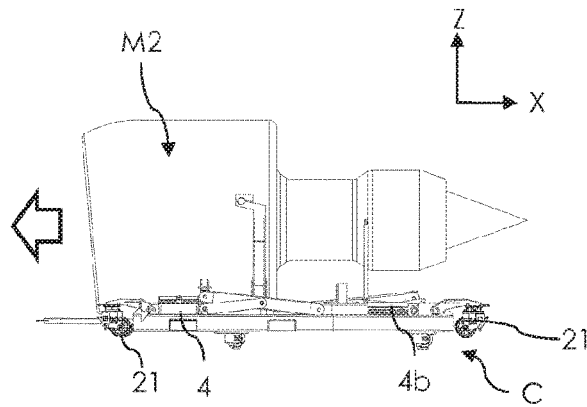

As shown in FIG. 11B, the movable base 2 is slid under the receiving cradle 1 of the second engine M2, then the lifting arms 3 are raised such that the weight of the second engine M2 is no longer supported by the supporting legs 13, but rather by the movable base 2. The supporting legs 13 are thus retracted into the retracted position, and the lifting arms 3 are then lowered such that the receiving cradle 1 is at rest on the damping members 4 in order to move the second engine M2 under the nacelle of the aircraft as shown in FIGS. 11C and 11D.

Figure 11E:
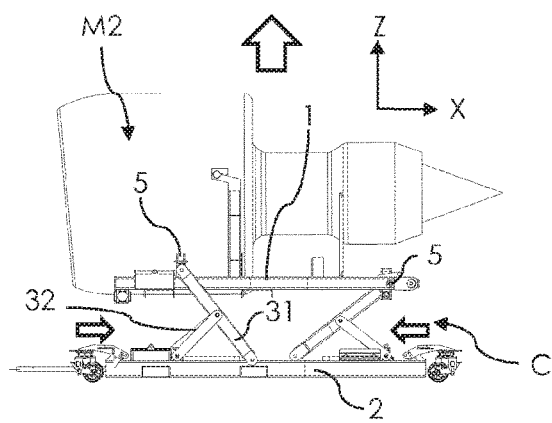

Once in position, the connection means between the receiving cradle 1 and the movable base 2 are modified, the lifting arms 3 of the movable base 2 are deployed so as to lift the second engine M2 in order to suspend it from the nacelle as shown in FIG. 11E. After installation of the second engine M2, the supporting arms 12 are retracted and the receiving cradle 1 is lowered so as to limit the bulk thereof and facilitate removal of the carriage C.

Figure 11F:
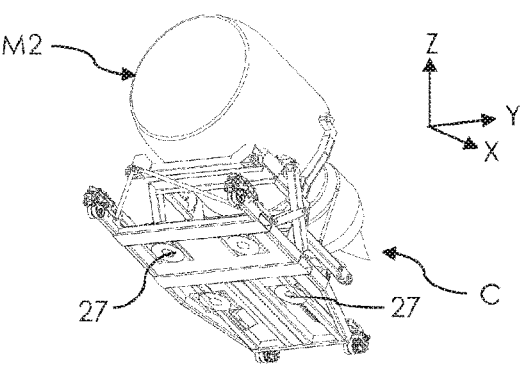

Advantageously, the movable base 2 is equipped with precise positioning means in order to enable the second engine M2 to be moved effortlessly and thus optimise installation. In this example, with reference to FIG. 11F, the precise positioning means take on the form of blowing members 27 arranged under the movable base 2 so as to form air cushions under the movable base 2. It goes without saying that other precise positioning means could be suitable, in particular rolling balls or elastomer plates.

Thanks to the invention, a single movable base 2 is used to move the two engines M1, M2, which procures financial and logistical savings. Moreover, engines that are not transported advantageously remain in a receiving cradle 1, which allows for the transportation thereof by other equipment, in particular a forklift. Moreover, the carriage 1 comprises its own lifting means, which limits the amount of equipment required for installing and removing an aircraft engine M1, M2.

Advantageously, a range of receiving cradles 1 can be proposed in order to be able to correspond to each type of aircraft engine M, while being able to universally connect to a movable base 2. Installation-removal means for each type of engine are no longer required.

The transportation of an aircraft engine is thus simple, fast, inexpensive and reliable. Such advantages allow the time required to carry out installation and removal operations to be reduced, which reduces the downtime of an aircraft, and thus greatly improves the profitability from the use of an aircraft.

Such a carriage C advantageously improves the rates of installation/removal for many aviation stakeholders, including aircraft manufacturers, airlines, repair companies (MRO), engine manufacturers and nacelle specialists, etc. The carriage C can be transported by plane, helicopter, train or by road with or without an engine. The receiving cradle 1 can also be transported by road or air, for which additional dampers may be necessary.

A second embodiment of a movable base 2 is described with reference to FIGS. 12 to 17. The reference numerals used to describe elements having a structure or function that is identical, equivalent or similar to those of the elements shown in FIG. 7-8 are the same, so as to simplify the description. Moreover, the description of the embodiment shown in FIG. 7-8 is not repeated in its entirety since this description applies to the elements shown in FIGS. 12 to 17 when there are no incompatibilities. Only noteworthy, structural and functional differences are described.

As shown in FIGS. 12 to 17, the movable base 2 comprises a frame 120 which has a high mechanical strength so as to be able to withstand a mass of several tonnes. The frame 120 has a U-shape and defines a body 121 and two side arms 122 suitable for moving parallel to one another.

Figure 15:
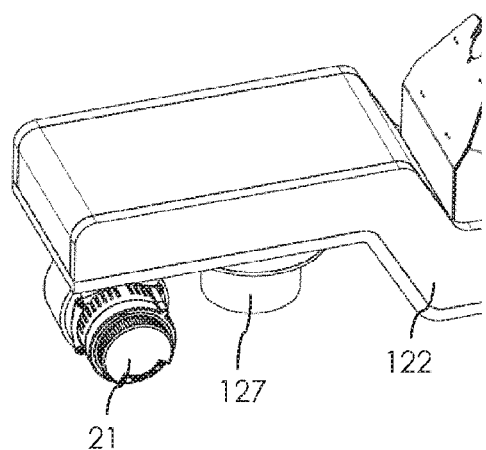
FIG. 15 shows one end of a side arm of the movable base according to the second embodiment.
Figure 16:
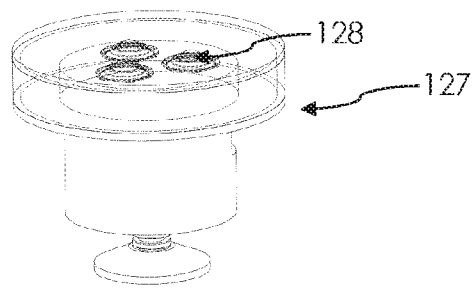
FIG. 16 shows a cylinder leg comprising rolling balls.

In a similar manner to that previously described, the movable base 2 comprises rolling means, in particular wheels 21 as shown in FIG. 15. Moreover, the movable base 2 is equipped with precise positioning means to allow the frame 120 to be moved effortlessly and to provide flexibility during the installation/removal of equipment. Preferably, precise positioning means are distributed on the lower surface of the frame 120, in particular near the rolling means. In this example, with reference to FIGS. 15 and 16, the precise positioning means comprise a cylinder leg 127 suitable for lifting the frame 120 relative to the ground, in particular, such that the rolling means are no longer in contact with the ground. With reference to FIG. 16, the precise positioning means further comprise rolling balls 128 mounted in the cylinder leg 127 so as to allow the frame 120 to roll during installation/removal when the cylinder legs 127 are deployed.

Figure 21:
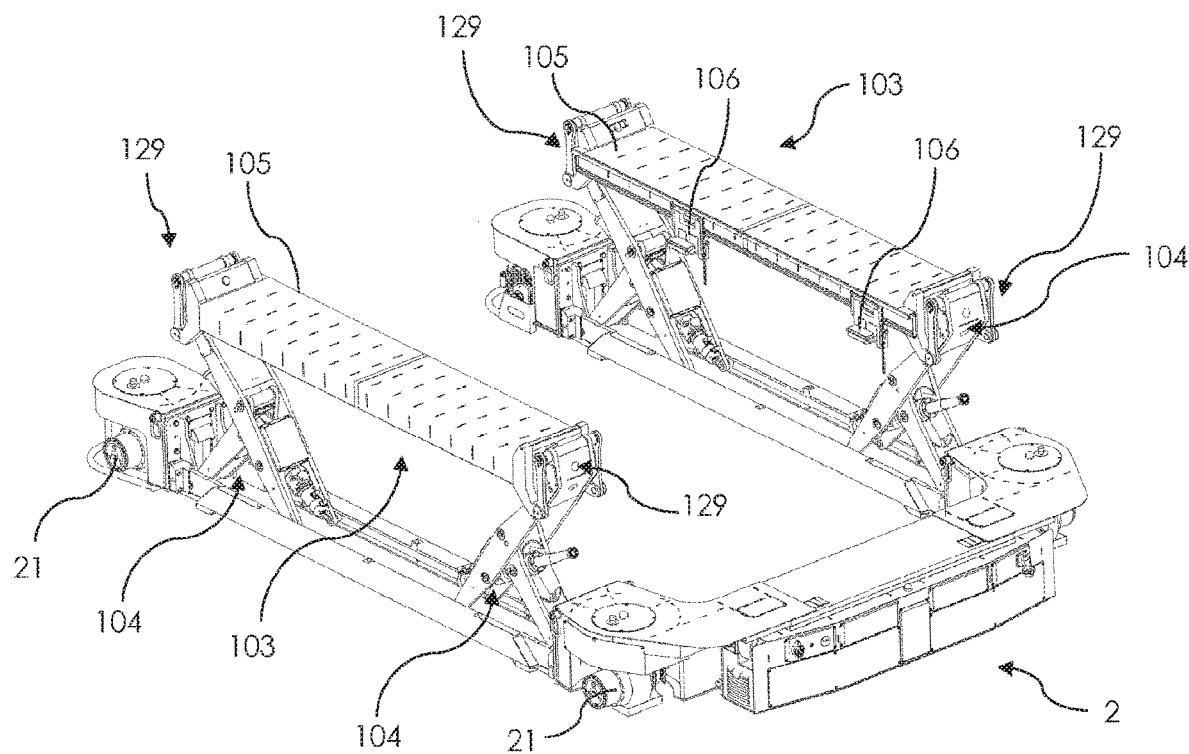
FIG. 21 is a perspective view of a movable base comprising means of precise displacement in the upper portion thereof.
Figure 22:
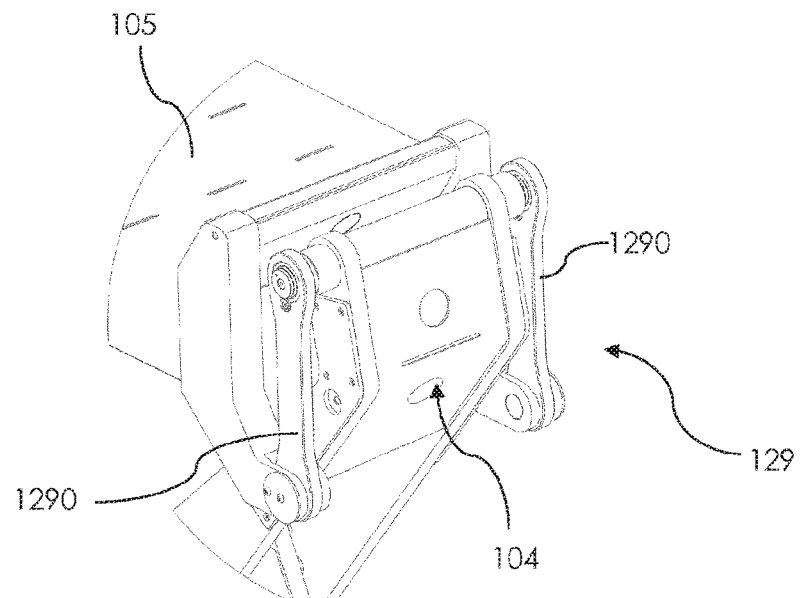
FIG. 22 is a close-up view of the means of precise displacement shown in FIG. 21.

According to another aspect of the invention, with reference to FIG. 21, the lifting means of each side arm 122 comprise means for precise displacement 129 designed to provide flexibility during the installation/removal of the equipment. Thus, the lower portion of the movable base 2 does not move; flexibility is provided only in the upper portion. With reference to FIGS. 21 and 22, the means for precise displacement 129 are situated in the upper portion of the lifting arm 103 so as to provide flexibility as close as possible to the engine during the installation and removal thereof. Each lifting arm 103 comprises a platform 105 and lifting mechanisms 104 connected to the ends of the platform 105 by the means for precise displacement 129. In this example, the means for precise displacement 129 comprise a plurality of connecting rods 1290 designed to allow precise movement in several directions in the manner of a swing or a pendulum. Each end of the platform 105 is connected to the lifting mechanism 104 by two connecting rods 1290. The ends of each connecting rod 1290 are connected to the platform 105 and to the lifting mechanism 104 by a ball joint link. The connecting rods having a ball joint 1290 allow for flexible movement in several directions in order to optimally orient the engine while being supported by the platform 105. Preferably, each connecting rod 1290 has a length that lies in the range 250 to 450 mm, preferably of the order of 350 mm. Advantageously, a position of equilibrium is obtained naturally as a result of gravity. Use of lifting cylinders or inclinometers is not necessary. The system is advantageously mechanical and passive, which reduces the risk of malfunction. Moreover, integration of the connecting rods 1290 makes it possible to maintain a compact movable base 2.

It goes without saying that the lifting means could comprise only three connecting rods 1290 in order to provide isostatic pendular support suitable for supporting a load that is off-centred from the centre of gravity. The use of four connecting rods 1290 advantageously increases rigidity.

Figure 23:
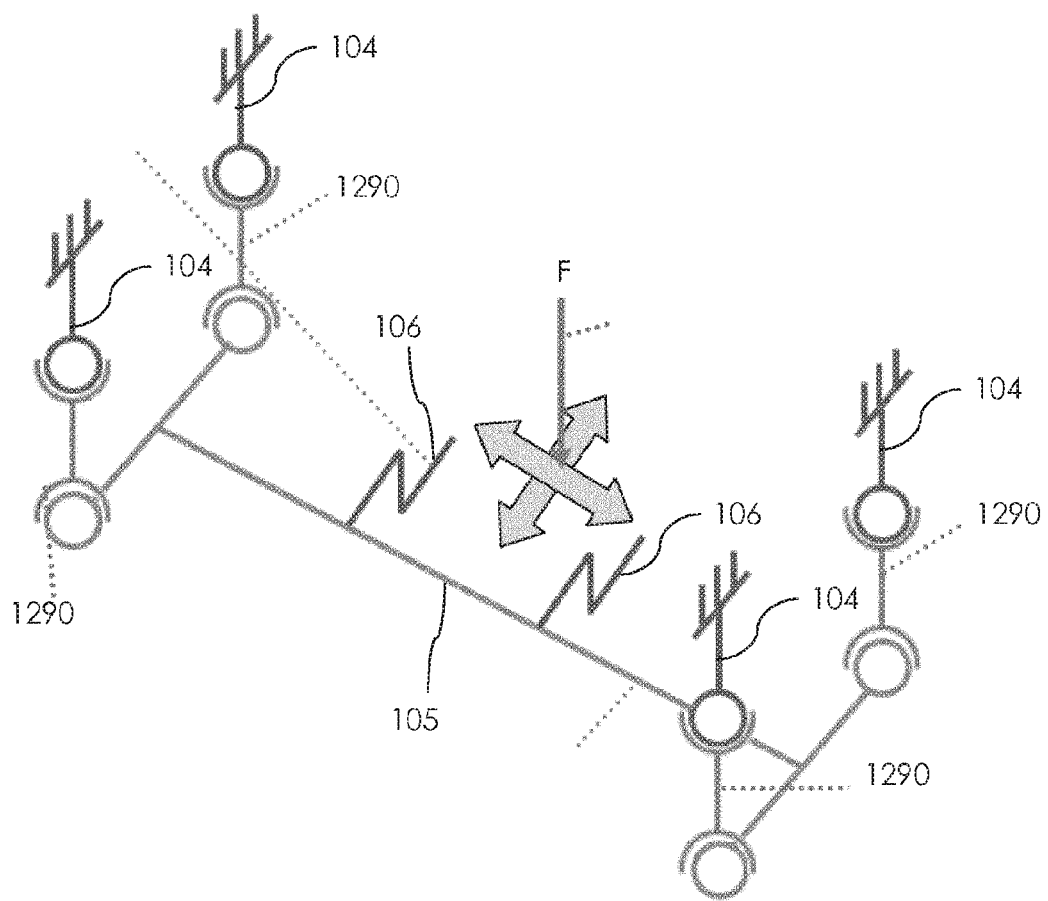
FIG. 23 is a diagrammatic view of the pendular support provided by the means of precise displacement.

With reference to FIG. 23, when an engine is supported by the lifting members 106, a load F is applied to the platform 105 and transmitted to the lifting mechanisms 104 via the connecting rods 1290 in order to provide pendular support. In this example, each end of the platform 105 is connected to the lifting mechanism 104 by a connecting rod 1290 working under tensile stress and a connecting rod 1290 working under compressive stress. This advantageously provides the operators with clearance for the installation/ removal operation, which can conveniently be used at breast height. In practice, a 7*t* piece of equipment can be moved in the horizontal plane 15 mm with respect to the position of equilibrium.

In this second embodiment, the movable base 2 is noteworthy in that the side arms 122 of the frame 120 are designed to move relative to one another so as to modify the spacing therebetween in order to grasp and lift a piece of equipment. In this example, the side arms 122 remain parallel during the movements thereof. Preferably, the spacing between the side arms 122 varies between 200 cm and 250 cm.

In this embodiment, the two side arms 122 of the frame 120 are capable of moving relative to the body 121 of the frame 120, although it goes without saying that only one side arm 122 could be capable of moving. Preferably, the body 121 is hollow and comprises the equipment for moving and controlling the side arms (engine, radio communication module, batteries, etc.).

In a similar manner to that of the first embodiment, the movable base 2 comprises lifting means designed to vertically move and incline a piece of equipment relative to the frame 120 so as to allow the installation and removal of said equipment.

Figure 12:
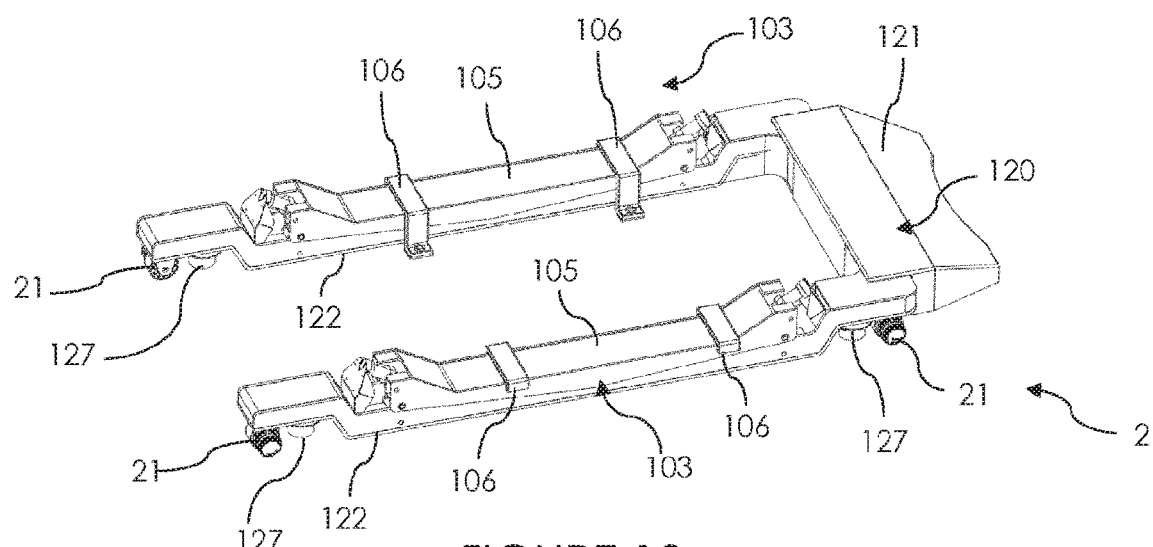
FIG. 12-14 show a second embodiment of a movable base 2.
Figure 13:
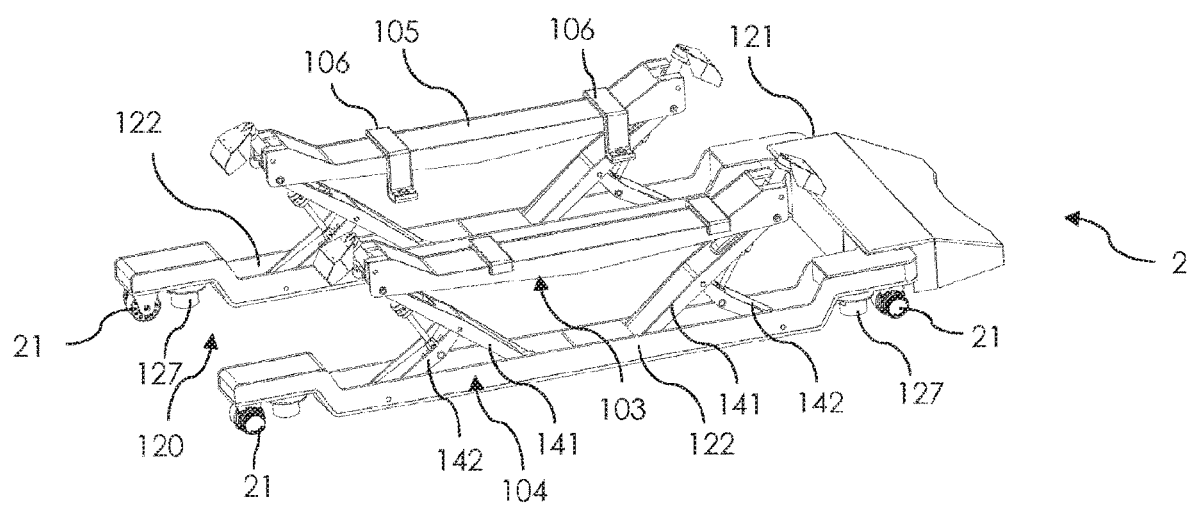

In this second embodiment, each side arm 122 comprises lifting means. With reference to FIGS. 12 to 13, each side arm 122 comprises a lifting arm 103 designed to lift equipment. In this example, each lifting arm 103 can be raised and inclined in the vertical plane in which the side arm 122 of the frame 120 extends.

With reference to FIG. 13, each lifting arm 103 comprises a platform 105 connected, at the ends thereof, to lifting mechanisms 104. In this example, each lifting mechanism 104 is designed to perform a kinematic scissors or half-scissors movement.

Figure 14:
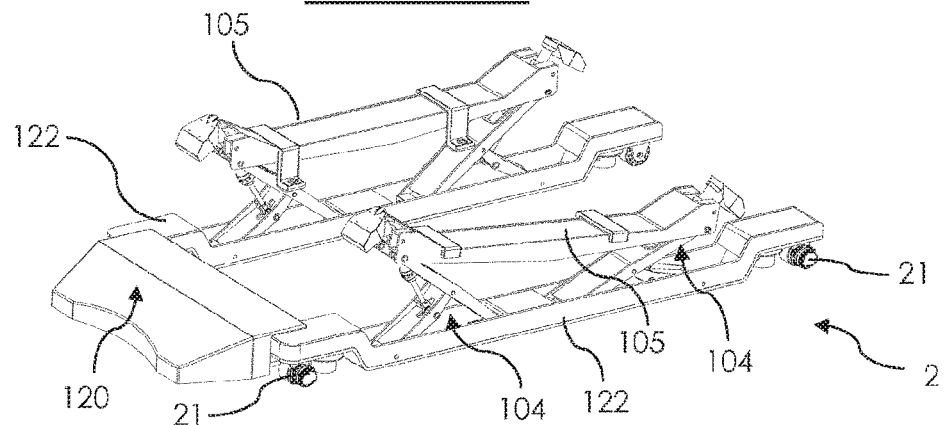

As shown in FIGS. 13 and 14, each lifting mechanism 104 comprises a first element 141 and a second element 142 and a displacement cylinder for raising/lowering one end of the platform 105. Each displacement cylinder can be controlled by an operator, preferably by means of a remote control.

Advantageously, each lifting arm 103 can be controlled independently in order to lift a device vertically, but also to incline it in both axes in order to facilitate an installation and removal operation as shown in FIG. 14. Such a degree of freedom facilitates the orientation of the engine M. In this second embodiment, the displacement means are designed to carry out a vertical movement of at least 100 cm, preferably of at least 150 cm. Moreover, the allowed degree of incline is of the order of +/−5° about the longitudinal axis X, and +/−10° about the lateral axis Y.

In this second embodiment, each lifting arm 103 further comprises lifting members 106 for lifting equipment, similar to forks. With reference to FIG. 12, two lifting members 106 are positioned on the platform 105 and project into the cavity of the U shape formed by the frame 120. Preferably, the longitudinal spacing between the lifting members 106 of the same lifting arm 103 is adjustable. Thus, the connecting members 106 can engage with equipment positioned between the side arms 122.

Figure 17:
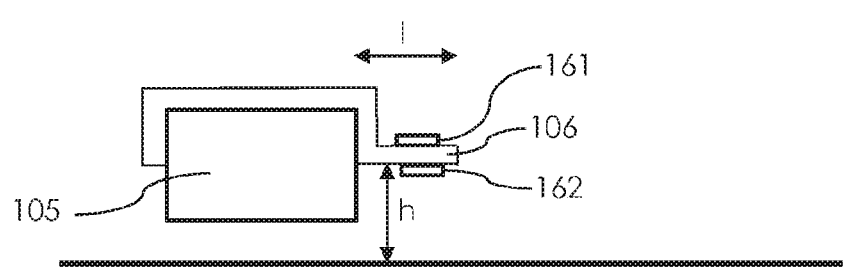
FIG. 17 is a diagrammatic view of a lifting member of the movable base according to the second embodiment.

With reference more particularly to FIG. 17, the lifting member 106 is secured to the platform 105 and comprises, on the upper surface thereof, a coating 161 suitable for not damaging the equipment to be grasped, preferably an elastomer coating. Preferably, the lifting member 106 comprises, on the lower surface thereof, rolling means 162 in order to allow a movement of the lifting member 106 on a flat surface, which is particularly advantageous when loading a truck similarly to that which will be described hereafter. Preferably, with reference to FIG. 17, the lifting member 106 projects laterally over a distance l that lies in the range 10 cm to 20 cm. More preferably, the lifting member extends to a height above the ground that lies in the range 0 cm to 20 cm when the lifting means are lowered.

It goes without saying that the movable base 2 could further comprise damping means as described above.

Figure 18:
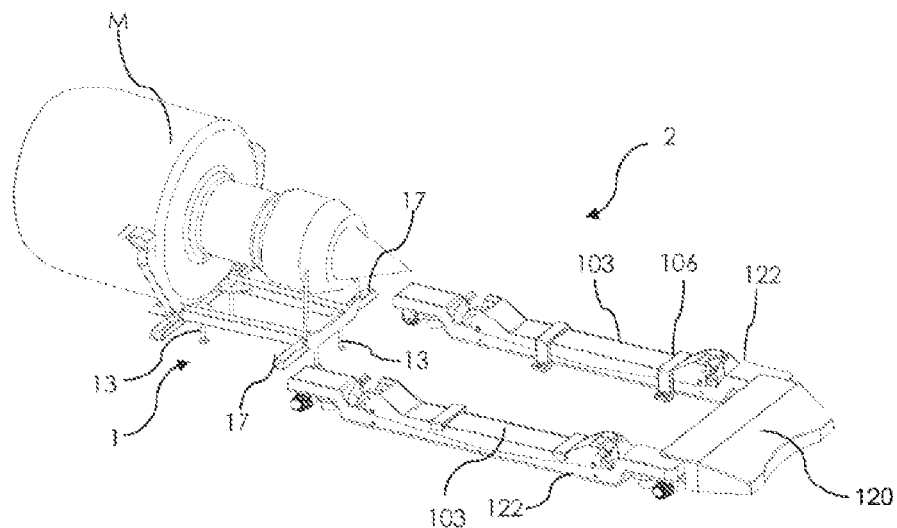
FIG. 18 is a diagrammatic view of the movable base according to the second embodiment prior to lifting an engine.
Figure 19:
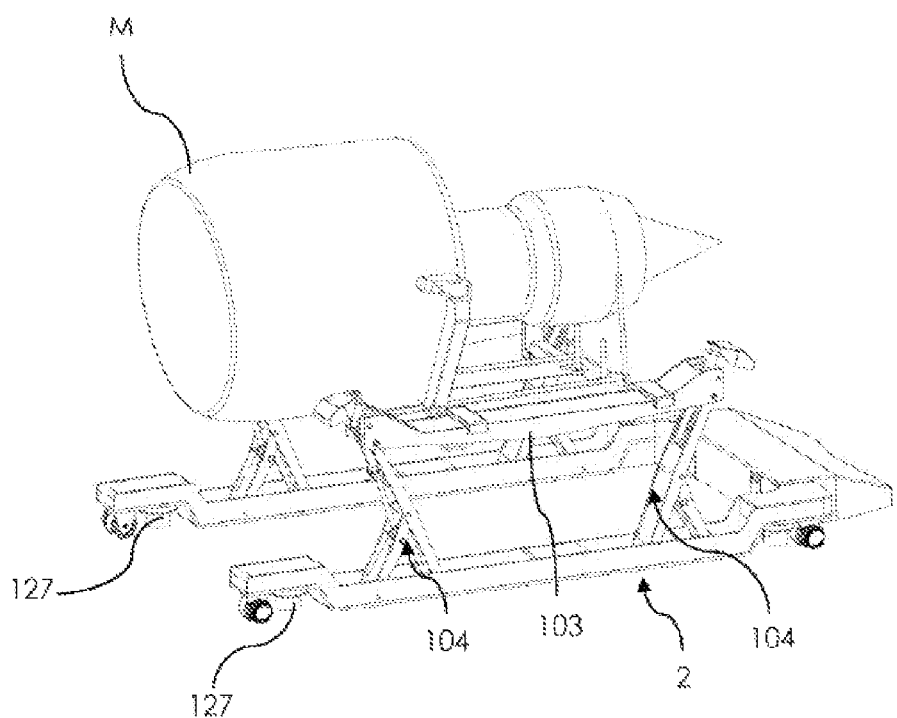
FIG. 19 is a diagrammatic view of the movable base according to the second embodiment when lifting and orienting an engine.

With reference to FIGS. 18 to 19, an engine M is positioned on a receiving cradle 1 according to the second embodiment of the invention. The movable base 2 is moved on the ground such that the side arms 122 extend outwardly from the receiving cradle 1, that is to say, until the receiving cradle 1 extends into the cavity of the U-shape formed by the frame 120.

The side arms 122 of the frame 120 are then brought together such that the lifting members 106 engage with the lifting supports 17, 18 of the receiving cradle 1. The lifting arms 103 are then activated in order to raise the cradle 1. The weight of the engine M is thus supported by the movable base 2 which can be moved near to the aircraft. Once in position at the place of assembly, the precise positioning means are activated. The cylinder legs 127 are lowered so as to raise the frame 120 above the ground and position it on the rolling balls 128. The frame 120 can thus be moved effortlessly by operators in order to mount the engine M with precision and flexibility in an open nacelle engine pylon. Moreover, each lifting mechanism 104 is independently activated in order to precisely orient the engine M.

Advantageously, the spacing capacity of the side arms 122 allows cradles, carriages and equipment of various dimensions to be carried. Moreover, such a movable base 2 of simple design makes it possible to avoid any interference with the cowls of the nacelle of the aircraft.

The movable base 2, according to the second embodiment of the invention, is particularly advantageous for loading equipment, in particular an engine, on a truck in the absence of a loading bay.

Figure 20A:
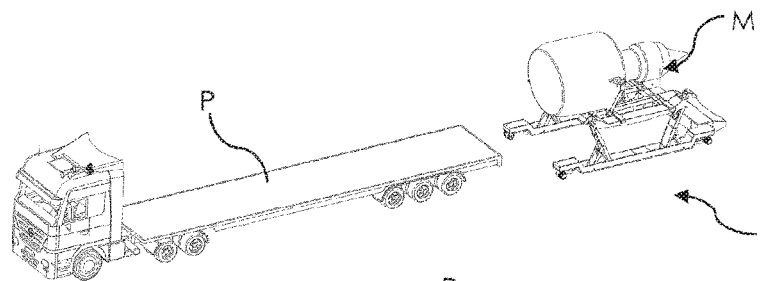
FIG. 20A-20F show steps for moving an engine on a truck bed by means of a movable base according to the second embodiment.
Figure 20B:
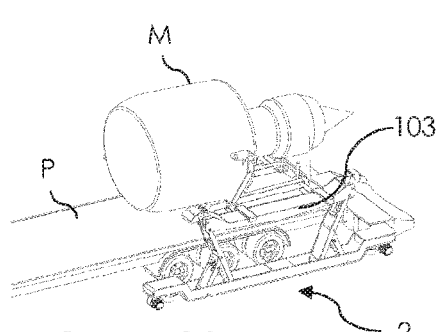

FIG. 20A shows a truck comprising a truck bed P which extends to a height of about 100 cm from the ground. To load the engine M, the movable base 2, the side arms 122 whereof are spaced apart, moves the engine M with the lifting arms 103 thereof in the horizontal high position so as to insert the truck bed P between the side arms 122 and under the cradle 1 of the engine M as shown in FIG. 20B.

Figure 20C:
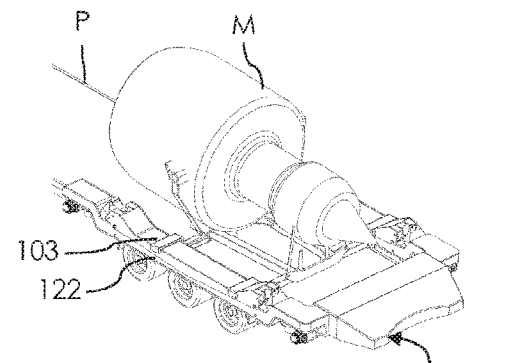
Figure 20D:
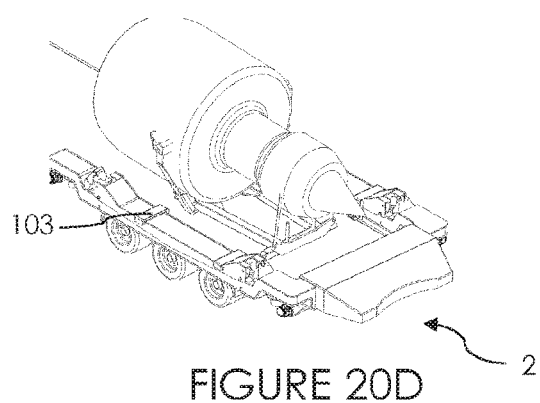
Figure 20E:
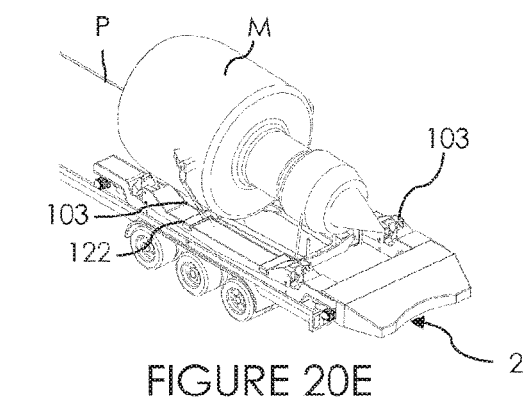

The side arms 122 of the frame 120 are then brought closer to one another such that the lifting members 106 extend above the truck bed P. The lifting arms 103 are then lowered such that the lifting members 106 come to bear against the truck bed 6. In return, as a result of the bearing of the lifting members 106 and the approaching of the lifting arms 103 of the frame 120 to one another, the frame 120 rises above the ground as shown in FIG. 20C. With the cradle 1 resting on the truck bed P, the lifting supports 17 are retracted to allow the side arms 122 of the frame 120 to be brought closer to one another and extend above the truck bed as shown in FIG. 20D. The side arms 22 are then brought closer to one another such that the movable base 2 extends over the truck bed P as shown in FIG. 20E. In other words, the engine M and the movable base 2 can be effortlessly lifted from the ground onto a truck bed P without any risk to the engine M.

Figure 20F:
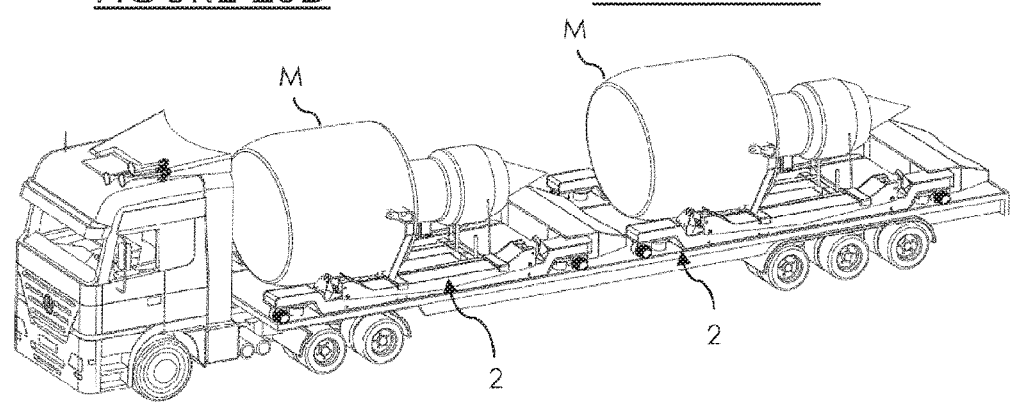

Advantageously, the engine M can then be safely moved by the movable base 2 on the truck bed P in order to be able to store a plurality of engines M on the same truck, as shown in FIG. 20F.

The installation of an engine in its cradle by the movable base 2 has been described; however, it goes without saying that other equipment could be moved by the movable base 2, in particular landing gear, etc. Moreover, the movable base 2 is suitable for moving an engine placed in a carriage according to the prior art, whereby the lifting members 106 engage with the sleeves of said carriage.

The invention claimed is:

1. A movable base for transporting equipment on the ground, in particular aviation equipment, the movable base comprising a frame comprising;
    two side arms designed to move parallel to one another so as to modify the spacing therebetween and means for rolling on the ground, which are connected to said frame, each side arm comprising lifting means designed to vertically move and tilt equipment situated between said side arms, the lifting means taking on the form of a lifting arm,
    each lifting arm comprising a platform and lifting mechanisms connected to the ends of the platform by a first means of precise displacement designed to provide flexibility during the installation/removal of the equipment.

2. The movable base according to claim 1, wherein the lifting means of a side arm comprise at least one lifting member extending towards the other of the two side arms.

3. The movable base according to claim 2, wherein the lifting member extends to a height above the ground that lies in the range 0 cm to 15 cm when the lifting means are lowered.

4. The movable base according to claim 2, wherein each side arm comprises at least two lifting members spaced apart from one another along the length of said side arm.

5. The movable base according to claim 1, wherein the frame has a U-shape defining a body and two side arms.

6. The movable base according to claim 1, wherein the lifting means of a side arm comprise at least two independent lifting mechanisms connected to said side arm so as to allow for tilting.

7. The movable base according to claim 1, further comprising a second means of precise displacement, independent of the rolling means, designed to support the frame on the ground.

8. The movable base according to claim 1, wherein the side arms are designed to be spaced at least 200 cm apart.

9. The movable base according to claim 1, wherein the side arms are designed to be spaced at least 250 cm apart.

10. The movable base according to claim 1, wherein the first means for precise displacement, being a plurality of connecting rods designed to allow precise movement in several directions in the manner of a swing or a pendulum, is such that the connecting rods are designed to allow a movement along a horizontal plane of at least 10 mm relative to a position of equilibrium.

11. The movable base according claim 1, wherein the first means for precise displacement, being a plurality of connecting rods designed to allow precise movement in several directions in the manner of a swing or a pendulum, is such that the ends of each connecting rod are connected by a ball joint link.

12. The movable base according to claim 1, wherein the first means for precise displacement, being a plurality of connecting rods designed to allow precise movement in several directions in the manner of a swing or a pendulum, is such that each connecting rod has a length that lies in the range 250 mm to 450 mm.

13. The movable base according to claim 1, wherein the first means for precise displacement, being a plurality of connecting rods designed to allow precise movement in several directions in the manner of a swing or a pendulum, is such that each lifting arm comprises a platform and two lifting mechanisms connected to the ends of the platform, each lifting mechanism being connected to one end of the platform by two connecting rods.

14. A method of transporting equipment by means of the movable base according to claim 1, the method comprising:
    a step of positioning the side arms of the frame such that the equipment is located between said side arms;
    a step of bringing the side arms closer together so as to engage with said equipment;
    a step of lifting the equipment using the lifting means such that said equipment is supported by said movable base, and
    a step of moving said movable base on the ground so as to move said equipment.

15. The movable base according to claim 1, wherein said first means of precise displacement is configured to allow precise movement of the platform in several directions, thereby providing said flexibility during the installation/removal of the equipment.

16. The movable base according to claim 1, wherein said first means of precise displacement is configured to allow precise movement of the platform in several directions in the manner of a pendulum, thereby providing said flexibility during the installation/removal of the equipment.

17. The movable base according to claim 1, wherein said first means of precise displacement is configured to allow precise movement of the platform in several directions in the manner of a pendulum, thereby providing passive flexibility during the installation/removal of the equipment.

* * * * *